United States Patent [19]

Borianne

[11] 4,009,522
[45] Mar. 1, 1977

[54] DEVICE FOR THE TEACHING AND/OR TRAINING IN THE GAME OF BRIDGE

[76] Inventor: Henri Marie Léon Borianne, 10 avenue de Wagram, 75008 Paris, France

[22] Filed: Oct. 28, 1975

[21] Appl. No.: 626,047

[30] Foreign Application Priority Data

Oct. 31, 1974 France .............................. 74.36417

[52] U.S. Cl. ..................................... 35/8 B; 35/75
[51] Int. Cl.² ........................................ G09B 19/22
[58] Field of Search ............ 273/148 R; 35/8 B, 75; 40/65; 235/89 R; 116/120

[56] References Cited

UNITED STATES PATENTS

| | | | |
|---|---|---|---|
| 2,007,055 | 7/1935 | Knust | 35/8 B |
| 2,204,199 | 6/1940 | Willis | 35/8 B |
| 2,395,088 | 2/1946 | Von Babo | 35/8 B |
| 3,013,349 | 12/1961 | Cooper | 35/75 |
| 3,597,853 | 8/1971 | Kucera | 35/8 B |
| 3,939,577 | 2/1976 | Amano | 35/8 B |

Primary Examiner—Anton O. Oechsle
Attorney, Agent, or Firm—Edwin E. Greigg

[57] ABSTRACT

The device comprises the combination of at least one printed support means with masking means provided with windows, said printed support means being associated with and movable relative to said masking means. The printed support means bears sets of printed symbols representing the card distributions in the deals of particular hands of two partners or of parts of these hands. The windows are adapted in size and relative position to permit the appearance therethrough of said sets of printed symbols and to enable the progress of the card game by said relative movement of said support means, for each particular deal envisaged, after having, if necessary, analyzed the successive bids of said hands and of those of the two imaginary opponents.

18 Claims, 5 Drawing Figures

DEVICE FOR THE TEACHING AND/OR TRAINING IN THE GAME OF BRIDGE

BACKGROUND OF THE INVENTION

The invention relates to a device for teaching and/or training how to bid and how to play the cards in the game of bridge.

Numerous devices exist for initiating or training people in playing bridge. They generally relate either to bidding or to the playing of the cards. Known devices which are intended for training in this card game generally reconstitute a card table on a reduced scale framed by hands representing particular distributions, the hands being shown under flaps which can be folded back or withdrawn, to cause the correct successively played cards to appear or in the form of detachable slips.

Such devices have a side with an attractive appearance to the beginner, notably devices with detachable slips, but require a certain manipulation which can bother the player who wishes above all to learn or practice. Moreover in devices intended for playing cards, the bidding portion is completely absent or inactive or does not present a didactic method, such as devices specially devised for the bidding process and which enable, for example, the user to reflect on the bid which he must make before checking from the device that it is well-based.

Now, it is obvious that it the playing of the card is important, the bidding methods are even more so. Also a complete device for training in the game of bridge must include at the same time a bidding or auction portion and a card-playing portion, preferably connected together by a study of particular deals selected by specialists, whilst leaving a considerable part for the reflection of the user, in order to simulate as far as possible a real game.

In addition, known devices oblige the user to refer at the end of the deal to particular comments, relating to various phases of the play or to the bids, which comments are printed on a portion of the device or on a small plate attached to the device. With such a device the user risks losing the advantage of certain remarks on phases of play which have terminated by the time that the user becomes aware of them. The user is obliged inconveniently to refer to them progressively with the development of the game.

SUMMARY OF THE INVENTION

It is an object of the invention to provide a simple and complete device, only requiring the minimum handling in instruction and/or training in the game of bridge.

It is another object of the invention to provide a device which permits the appearance of possible comments at the very moment of the play of the card or the making of the bid.

The device according to the invention is constituted by at least one printed support sheet moveable relative to a masking device provided with windows, such a support sheet sliding in the masking device constituted by a sheath, a cover or flat casing, notable in that the windows of the masking device are designed to permit characters printed on the support sheet to appear, of the particular hands of the two partners or of parts of these hands, as well as the development of the card game, by sliding said sheet, for each particular distribution envisaged, after having, if necessary, analyzed the successive bids of said hands and those of the two imaginary opponents.

Thus not only can the user study the selected hands fully, the bids and the card play, by simple sliding of a sheet in a sheath, but he can also confine himself, with sheets printed for this purpose to studying only a part of the progress of a deal, paying attention for example to only one phase of the game or to the playing of the cards of only one suit.

In addition a part of the sheath can be devoted to a more restricted study of the bids and can include for this purpose at least one group of windows designed to permit the appearance by sliding a sheet, of a plurality of hands inscribed on this sheet, as well as the bids corresponding to at least one opening and a response made between each of said hands and an imaginary partner.

Thus it is possible to provide different groups of windows designed for progressive teaching of bidding methods and representing, from one group to another, an additional stage in teaching bridge bidding.

BRIEF DESCRIPTION OF THE DRAWINGS

The invention will be better understood by reading the description which follows of one embodiment of the device according to the invention and on studying the accompanying drawing in which:

FIGS. 1 and 2 show in part a flat sheath 1 and a flat printed sheet 2 of strong paper, card or the like adapted to side in said sheath. The sheath 1 is provided with two oblong windows 3 and 4 designed to allow notably the appearance of two associated hands 5 and 6 generally placed North and South. These hands are represented by cards which are traditionally identified by letters and numbers and which are grouped by suit, each suit being indicated on the sheet or, as in the example, on the sheath by a conventional sign. Four windows 7, 8, 9, and 10, smaller in size, are arranged substantially in a cross and are respectively attributed to the hands South, West, North and East, the hands East and West constituting the diagonal to the imaginary opponents of North and South. Two additional windows 11 and 12 are provided to display for example the number of raises made respectively by each of the diagonals.

Figure 1:
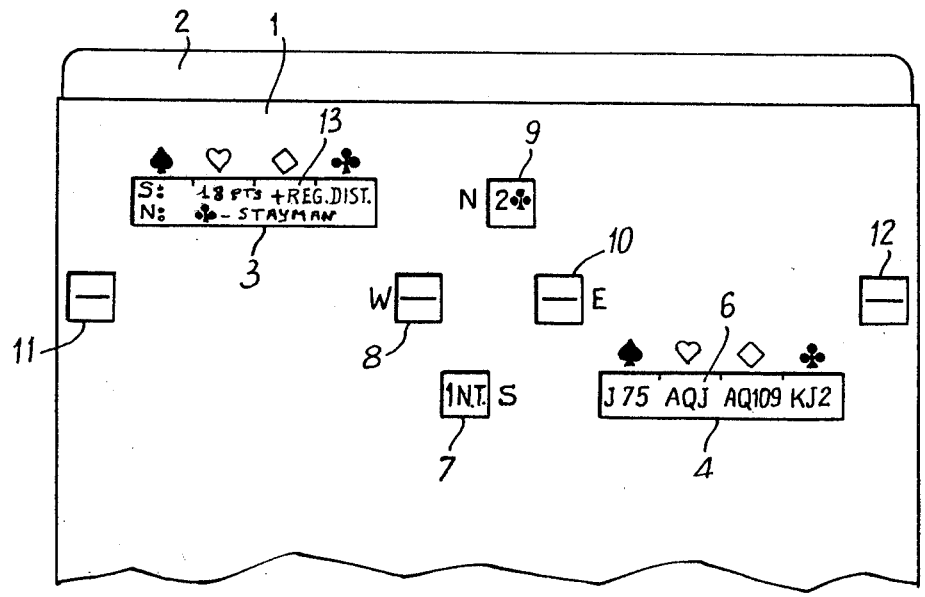
FIGS. 1 and 2 show in part one embodiment of a device according to the invention, namely a sheet and the surface of its sheath in various relative positions.

The handling and the use of this device is simple to understand. The user who is assumed to be South slides the sheet 2 in the sheath 1 until the appearance through the window 3 of indications of a general nature such as: the positive of the dealer, and if necessary, the vulnerability of one or both of the diagonals. The gradual sliding of the sheet will then cause the appearance of South's hand in the window 4 and the successive bids of each of the hands. If the dealer is South, that is to say if he is the first bidder, a complete round of bids will appear through the corresponding windows 7, 8, 9, and 10. The user will then imagine the subsequent bid which he must make and will verify the accuracy of his judgment by sliding the sheet again by one line. Comments regarding the bids then appear advantageously through window 3, as shown at 13, FIG. 1. When a contract is decided between South and North, the hand of the latter appears through the window 3 and thus simulates the layout of the hand of "dummy". Simultaneously, or one line later, West's opening card appears through the window 8 and the user South considers the card to be played by North. The sliding of the following line will cause the card which North must in fact play, to appear, as well as that of East and the play of the hand can thus advance. When a new card is played by one of the hands represented as North or South, it appears on the sheet through its appropriate window 9 or 7 and disappears from the window 3 or 4 showing the corresponding hand.

In addition in the course of playing the cards, comments appear through one of the windows 3 or 4. Thus the user will be guided and advised by a specialist at the moment itself of playing the card or of bidding.

It is of course obvious that the printed sheets can only include one part of a deal or one part of the distribution. It may in fact be advantageous to study only the play of a particular suit for example.

Figure 2:
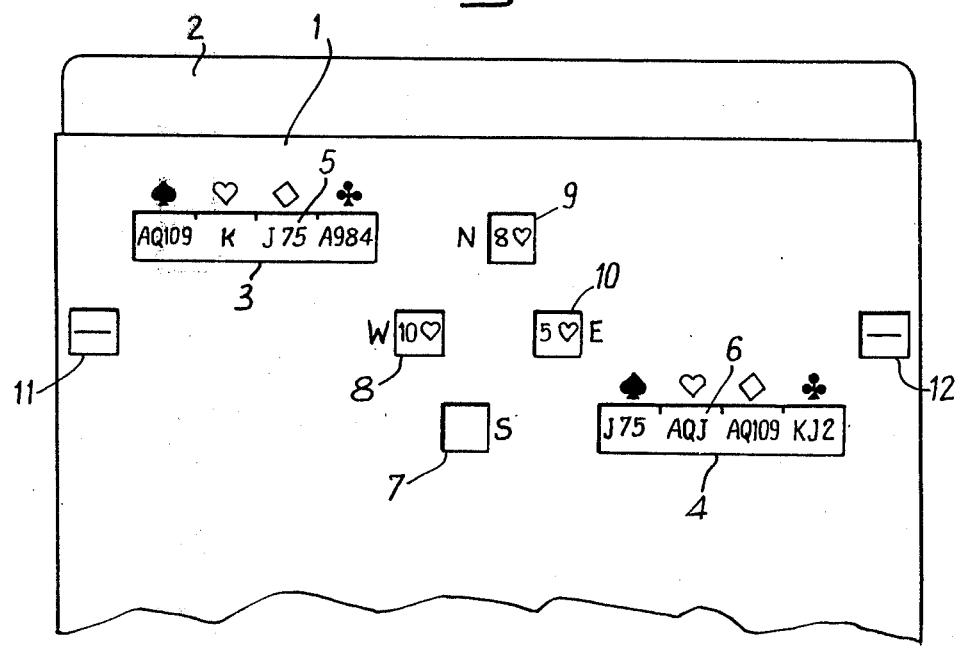
Figure 3:
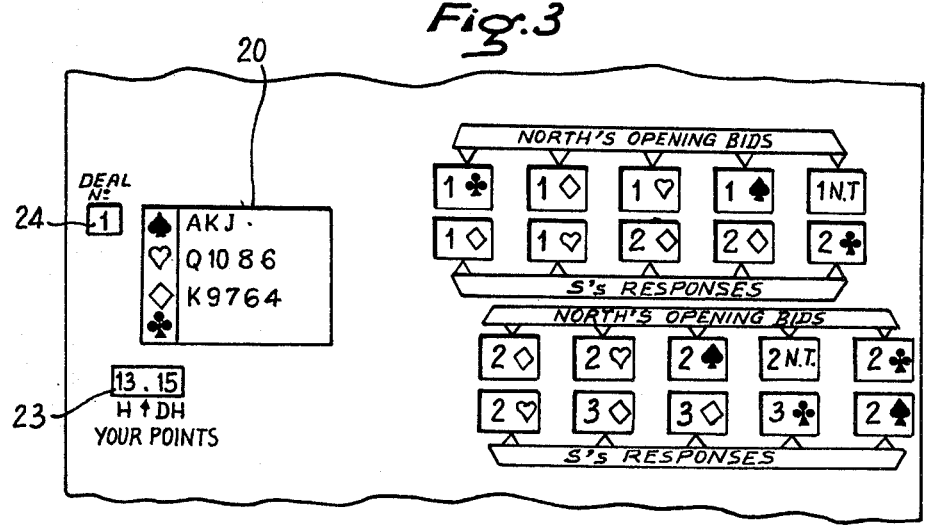
FIGS. 3, 4, and 5 show in part another zone or the other surface of the sheath of FIGS. 1 and 2 provided with windows, designed for the process of bidding and the bids.
Figure 4:
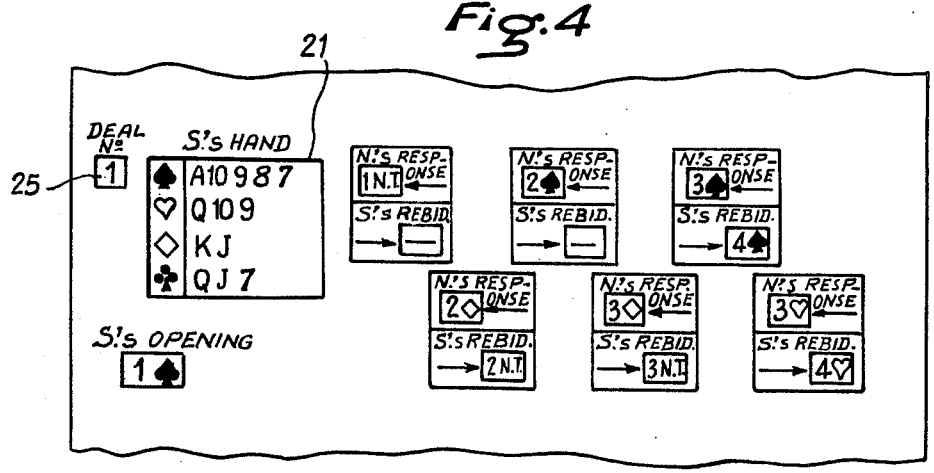
Figure 5:
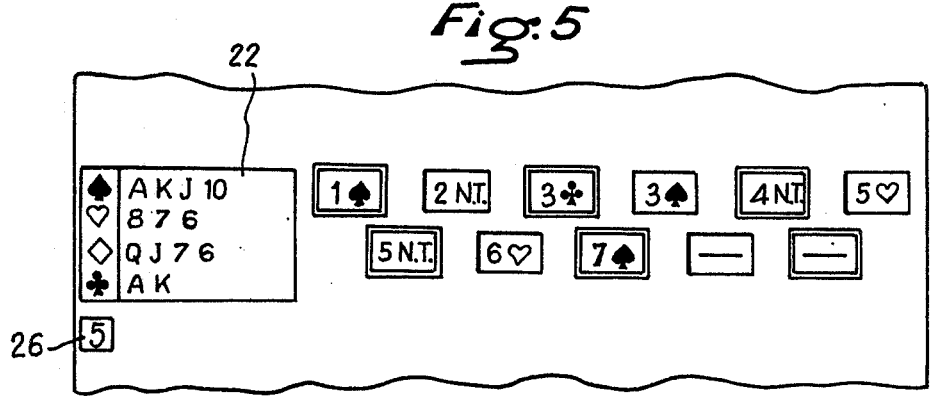

FIGS. 3, 4, and 5 show in part another zone or the other surface of the sheath of FIGS. 1 and 2. The zone or surface of the sheath is provided with various groups of windows intended for the processes of bidding. Each of these groups is notably provided with one large window 20, 21, 22 intended to allow the appearance by sliding the sheet, of a plurality of successive hands, printed on said sheet by line and by set of cards.

On one of the lateral edges of each of the windows 20, 21, 22 are drawn in a column the four conventional symbols representing the four possible suits in a game of bridge so as to attribute to each line of printing according to the symbol opposite and hence to each set of cards along its vertical position, a predetermined suit. This feature enables the passing from one hand to another by sliding the sheet by at least one line, which eliminates at least one set of cards and introduces as many new sets whilst displacing the other sets vertically. Each set of cards preserved in the window for the new hand obtained after sliding, then corresponds, according to its new position, to a new suit.

It is quite obvious that the windows can be of different shapes, for example, like those shown in FIGS. 1 and 2. However the particular arrangement described above enables a substantial grain in space width-wise on the sheath and the sheets without taking up more space vertically, since it is possible to pass from one hand to the other by sliding through a single line.

Besides the windows printed to permit the appearance of the different hands, smaller windows are designed to allow different phases of the bidding to appear. Thus in FIG. 3, the windows and a suitable sheet, the back for example of a sheet intended on its front for the other surface of the sheath, enable a study of the optimal responses which must be made, for each hand displayed in different openings, printed on the sheet and assumed to be made by the imaginary partner of this hand. FIG. 4 shows an arrangement which enables additional study with respect to the preceding one, namely the correct opening bid which should normally be made by each hand proposed, as well as different responses of an imaginary hand associated with the hand concerned and the corresponding rebids of the latter.

Finally, FIG. 5 shows an arrangement which enables the study of a complete sequence of bids, between one hand and that of his imaginary partner, from the opening of one of them to a final contract.

It is of course obvious that all the windows of the examples described can be arranged in any manner, but an advantageous arrangement is formed when there is no overlap of the windows from one vertical line to another so as to be able to pass from one phase of play or from one distribution to the other by sliding by one line of the sheet in the sheath.

Additional windows are, if necessary, provided to indicate the number of honor points and/or distribution points of the hands concerned such as window 23, FIG. 3, reference numbers of the deals, windows 24, 25, 26 in the respective FIGS. 3, 4, and 5, the vulnerability of one or of both the diagonals, etc. In addition, further comments are, if necessary, borne by the sheets and/or the masking device.

Numerous other modifications in the distribution of the windows and of the data borne by the sheets may be introduced without departing from the scope of the invention. It is possible thus to imagine a masking device and a sheet in the form of disks for relative rotary movement or any other form.

I claim:

1. A device for teaching or practicing both bidding and the play of the hand for the card game of bridge, which comprises:

at least one first printed support means, associated with and movable along a fixed path of travel relative to a masking means, said support means bearing non-overlapping columns of information relative to the bidding or play of the hand along the path of travel, said information being printed along lines orthogonal to the path of travel of the support means, said columns including at least four columns having lines of printed symbols sequentially representing first the bidding, then the play of the hand for successive rounds of play, respectively for the player, his partner, and their two opponents (North, South, East, West) a fifth column of sequentially arranged lines of printed symbols representing the hand of the player as it appears to him at each stage of the game, and a sixth column of sequentially arranged lines of printed information and comments relative to the bidding initially, and then during the play of the hand, printed symbols representing the second hand which becomes known to the player after bidding is complete, as this hand appears to him during successive rounds of the play of the cards; and said masking means, having at least six windows corresponding respectively to the six columns of the support means, each window being adapted in size and relative position to permit the appearance therein of only the printed information in a single corresponding column, in the proper sequence when the support means is moved in a given direction along its path of travel so that the player sees only those symbols representing the bids he would hear, or the cards he would see, at that particular point in the game corresponding to the position of the support means relative to the masking means, whereby each column of information of said support means is disposed, relative to its corresponding window of said masking means, to allow the appearance therethrough, when said support means is moved from one position to the next sequential position, of the information pertinent to the next portion of the game, without any nonpertinent information appearing in said windows between adjacent, successive positions of said support means.

2. A device as described in claim 1, wherein said support means is a sheet, and masking means is a flat sheath, and said path of travel is a straight line.

3. A device as described in claim 2, wherein the four windows of said sheath which correspond to the first four columns of said sheet are arranged substantially in a cross.

4. A device as described in claim 2, wherein the second hand that becomes known to the player after bidding is complete, is the hand of the player's partner.

5. A device as described in claim 2, wherein additional comments concerning the bidding and play of the hand are printed on said support means.

6. A device as described in claim 2, wherein said support means includes an additional column containing lines of printed numerical information representing the number or raises made by one set of partners, and said masking means includes an additional window for allowing the appearance therein of the number of raises made by one the appearance therein of the number of raises made by one set of partners as such raises occur in the process of the game.

7. A device as described in claim 1, which further comprises:
at least one second printed support means, associated with and movable along said fixed path of travel relative to said masking means, said second support means bearing non-overlapping columns of information relative to bidding player's hand along the path of travel, said information being printed along lines orthogonal to the path of travel of said second support means, said columns of said second support means including a first column having lines of printed symbols representing the value of a selected number of cards of the same suit, said first column including at least one series of said lines which are sequentially arranged so that the number of cards represented by any four successive lines of said at least one series equals a full hand of 13 cards, and said second support means also including at least one other column having lines of printed symbols, each line representing a bid by the player for a corresponding group of four lines of said at least one series, in which the suit of each line is determined by the position of said second support means relative to said masking means;
wherein said masking means further includes a large window corresponding to said first column of said second support means, which is adapted in size and relative position to permit the appearance therein of exactly four lines of said first column of said second support means, so that as said second support means is moved to its next position, at least two of the four lines are preserved within said large window, said masking means having four symbols representing the four card suits printed along a side of said large window so that each suit symbol is adjacent one of the four lines of said first column of said second support means within said large window, said masking means also including at least one other window corresponding to said at least one other column of said second support means, within which appears said bid by the player for the hand appearing simultaneously within said large window.

8. A device as described in claim 7, wherein said masking means is a flat sheath, said first support means comprises one side of a sheet, and said second support means comprises an opposite side of said sheet and said path of travel is a straight line.

9. A device as described in claim 7, wherein said at least one other column of said second support means includes a plurality of columns other than said first column, wherein each line of each said other column represents a bid by the player for said corresponding hand of said first column in response to a given opening bid by the player's partner; and
said at least one other window of said masking means includes a plurality of windows, each corresponding to a respective one of said plurality of other columns of said second support means, and each having a respective symbol representing said given opening bid of the player's partner printed along one side of the window, wherein a respective bid by the player, for the hand simultaneously appearing within said large window, appears within each of said other windows in response to the opening bid of the player's partner corresponding to, and printed alongside of, each of said other windows.

10. A device as described in claim 6, wherein said second printing support means includes 10 said other columns, and each of the corresponding ten windows of the masking means has printed along one side thereof a respective one of the 10 symbols representing all possible one and two opening bids (one or two of a suit, one or two no trump) by the player's partner.

11. A device as described in claim 7, wherein said at least one other column of said second means includes one column having lines of printed symbols representing opening bids by the player for the corresponding hands of said first column of said second support means, and at least one pair of columns wherein a first one of said pair of columns has lines of printed symbols representing a bid of the player's partner in response to the corresponding opening bid of the player, and the second other one of said pair of columns has lines of printed symbols representing a subsequent re-bid by the player in response to his partner's bid, all of which appear simultaneously within respective corresponding windows of said masking means at each successive position of said support means, said corresponding windows being identified by printed symbols or legends therebeside identifying the bids appearing therein.

12. A device as described in claim 9, wherein said at least one other column of said second support means includes a plurality of columns, each having lines of printed symbols corresponding to a one bid of a complete sequence of bids between the player and his partner, to thereby allow the appearance for each hand of the player, a complete sequence of bids of the player and his partner, from the opening bid of one of them to the final contract, within the corresponding windows of the masking means.

13. A device as described in claim 7, which further comprises an additional column of printed members on said second support means for identifying the number of the corresponding hand of said first column of said second support means, and an additional window in said masking means within which said number appears simultaneously with the corresponding hand appearing within said large window.

14. A device as described in claim 7, which further comprises an additional column of printed numbers on said second support means for identifying the high card and distribution points of the corresponding player's hand, and an additional window in said masking means within which said distribution point information appears for each said hand appearing in said large window.

15. A device for teaching or practicing bidding for the card game of bridge, which comprises:
at least one printed support means, associated with and movable along a fixed path of travel relative to a masking means, said support means bearing non-overlapping columns of information relative to bidding of a player's hand along the path of travel, said information being printed along lines orthogonal to the path of travel of said support means, said columns of said support means including a first column having lines of printed symbols representing the value of a selected number of cards of the same suit, said first column including at least one series of more than four said lines which are sequentially arranged so that the number of cards represented by any four successive lines of said at least one series equals a full hand of thirteen cards, and said support means also including at least one other column having lines of printed symbols, each line representing a bid by the player for a corresponding group of four lines of said at least one series, in which the suit of each line is determined by the position of said support means relative to said masking means; and
said masking means, which include a large window corresponding to said first column of said support means, which is adapted in size and relative position to permit the appearance therein of exactly for lines of said first column of said support means, so that as said support means is moved to its next position, at least two of the four lines are preserved within said large window, said masking means having
four symbols representing the four card suits printed along a side of said large window so that each suit symbol is adjacent one of the four lines of said first column of said support means within said large window, said masking means also including at least one other window corresponding to said at least one other column of said support means, within which appears said bid by the player for the hand appearing simultaneously within said large window.

16. A device as described in claim 15, wherein said at least one other column of said support means includes a plurality of columns other than said first column, wherein each line of each said other column represents a bid by the player for said corresponding hand of said first column in response to a given opening bid by the player's partner; and
said at least one other window of said masking means includes a plurality of windows, each corresponding to a respective one of said plurality of other columns of said support means, and each having a respective symbol representing said given opening bid of the player's partner printed along one side of the window, wherein a respective bid by the player, for the hand simultaneously appearing within said large window, appears within each of said other windows in response to the opening bid of the player's partner corresponding to, and printed alongside of, each of said other windows.

17. A device as described in claim 15, wherein said at least one other column of said support means includes one column having lines of printed symbols representing opening bids by the player for the corresponding hands of said first column of said support means, and at least one pair of columns wherein a first one of said pair of columns has lines of printed symbols representing a bid of the player's partner in response to the corresponding opening bid of the player, and the second other one of said pair of columns has lines of printed symbols representing a subsequent re-bid by the player in response to his partner's bid, all of which appear simultaneously within respective corresponding windows of said masking means at each successive position of said support means, said corresponding windows being identified by printed symbols or legends therebeside identifying the bids appearing therein.

18. A device as described in claim 15, wherein said at least one other column of said support means includes a plurality of columns, each having lines of printed symbols corresponding to a one bid of a complete sequence of bids between the player and his partner, to thereby allow the appearance for each hand of the player, a complete sequence of bids of the player and his partner, from the opening bid of one of them to the final contract, within the corresponding windows of the masking means.

* * * * *